US012786813B2

(12) United States Patent
Jang et al.

(10) Patent No.: US 12,786,813 B2
(45) Date of Patent: Nov. 3, 2026

(54) METHOD AND APPARATUS FOR ACCESSING NETWORK BY REDUCED-CAPABILITY TERMINAL HAVING LIMITED RECEPTION CAPABILITY IN WIRELESS COMMUNICATION SYSTEM

(71) Applicant: Samsung Electronics Co., Ltd., Suwon-si (KR)

(72) Inventors: Jaehyuk Jang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 18/281,128

(22) PCT Filed: Mar. 24, 2022

(86) PCT No.: PCT/KR2022/004148
§ 371 (c)(1),
(2) Date: Sep. 8, 2023

(87) PCT Pub. No.: WO2022/211371
PCT Pub. Date: Oct. 6, 2022

(65) Prior Publication Data
US 2024/0155442 A1 May 9, 2024

(30) Foreign Application Priority Data
Mar. 31, 2021 (KR) ........................ 10-2021-0042326

(51) Int. Cl.
*H04W 36/00* (2009.01)
*H04W 36/08* (2009.01)

(52) U.S. Cl.
CPC ....... *H04W 36/0061* (2013.01); *H04W 36/08* (2013.01)

(58) Field of Classification Search
CPC ......... H04W 36/0005; H04W 36/0055; H04W 36/0061; H04W 36/08; H04W 4/70; H04W 48/08; H04W 48/12; H04W 48/20
See application file for complete search history.

(56) References Cited

U.S. PATENT DOCUMENTS

| | | | |
|---|---|---|---|
| 9,485,664 | B2 | 11/2016 | Jha et al. |
| 10,362,624 | B2 | 7/2019 | Mochizuki et al. |

(Continued)

FOREIGN PATENT DOCUMENTS

| | | | |
|---|---|---|---|
| JP | 2020-036373 | A | 3/2020 |
| KR | 10-2016-0144456 | A | 12/2016 |

(Continued)

OTHER PUBLICATIONS

Fujitsu, "Cell reselection of RedCap UE", Jan. 25-Feb. 5, 2021, 3GPP TSG-RAN WG2 Meeting #113 electronic, R2-2100755, pp. 1-3 (Year: 2021).*

(Continued)

*Primary Examiner* — Paul H. Masur
(74) *Attorney, Agent, or Firm* — Jefferson IP Law, LLP

(57) ABSTRACT

The disclosure relates to a 5G or 6G communication system for supporting a higher data transmission rate. A method performed by a terminal of a wireless communication system, according to one embodiment of the present disclosure, comprises the steps of: receiving a master information block (MIB) from a base station; receiving, on the basis of the MIB, a system information block (SIB) 1 from the base station; receiving, on the basis of the SIB 1 from the base station, at least one piece of system information including cell reselection-related information; and performing a cell reselection procedure on the basis of the cell reselection-related information. The cell reselection-related information includes cell reselection priority information for each frequency for a terminal having limited reception capability (Continued)

and cell reselection priority information for each frequency for an ordinary terminal.

15 Claims, 9 Drawing Sheets

(56) References Cited

U.S. PATENT DOCUMENTS

| | | | | |
|---|---|---|---|---|
| 2022/0225392 | A1* | 7/2022 | Lee | H04W 72/23 |
| 2022/0279595 | A1 | 9/2022 | Jang et al. | |
| 2022/0312530 | A1* | 9/2022 | Turtinen | H04W 76/10 |
| 2023/0319841 | A1* | 10/2023 | Ratasuk | H04L 1/0063<br>370/329 |
| 2024/0015641 | A1* | 1/2024 | Nagano | H04W 4/70 |
| 2024/0031911 | A1* | 1/2024 | Nagano | H04W 48/20 |
| 2024/0073960 | A1* | 2/2024 | Hossain | H04W 74/0833 |

FOREIGN PATENT DOCUMENTS

| | | | |
|---|---|---|---|
| KR | 10-2021-0020397 | A | 2/2021 |
| WO | 2021/011605 | A1 | 1/2021 |

OTHER PUBLICATIONS

3GPP TS 36.304 V16.3.0, 3rd Generation Partnership Project; Technical Specification Group Radio Access Network; Evolved Universal Terrestrial Radio Access (E-UTRA); User Equipment (UE) procedures in idle mode, (Release 16), Jan. 7, 2021.

Apple, Discussion on slice based cell selection and re-selection, R2-2100876 resubmission of R2-2009473, 3GPP TSG-RAN WG2 Meeting #113-e, Electronic, Jan. 15, 2021.

3GPP TS 38.304 V16.3.0, 3rd Generation Partnership Project; Technical Specification Group Radio Access Network; NR; User Equipment (UE) procedures in Idle mode and RRC, Inactive state, (Release 16), Jan. 6, 2021.

3rd Generation Partnership Project; Technical Specification Group Radio Access Network; NR; Radio Resource Control (RRC) protocol specification (Release 16), 3GPP TS 38.331 V16.3.1, Jan. 7, 2021.

Qualcomm Incorporated, Impact of reduced capabilities on upper-layer procedures, R2-2100311, 3GPP TSG-RAN WG2 Meeting #113-e Online, Jan. 15, 2021.

Korean Office Action dated Aug. 24, 2026, issued in Korean Patent Application No. 10-2021-0042326.

* cited by examiner

METHOD AND APPARATUS FOR ACCESSING NETWORK BY REDUCED-CAPABILITY TERMINAL HAVING LIMITED RECEPTION CAPABILITY IN WIRELESS COMMUNICATION SYSTEM

TECHNICAL FIELD

The disclosure relates to a wireless communication system. More specifically, the disclosure relates to a method in which a 1RX terminal having one reception antenna among "reduced capability (RedCap)" terminals with reduced price and complexity in 3GPP 5G new radio (NR) accesses a network.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Recently, with the development of long term evolution (LTE), LTE-Advanced, and new radio (NR), a method and an apparatus for moving a RedCap terminal having low reception performance to a base station which can effectively support the RedCap terminal and operating the same are necessary.

DISCLOSURE OF INVENTION

Technical Problem

The disclosure proposes a method for enabling a RedCap terminal having low (or limited) reception performance to efficiently move to a base station (for example, a base station using a low frequency band) which can effectively support the RedCap terminal, and operate in a wireless communication system.

Solution to Problem

A method performed by a terminal of a wireless communication system according to an embodiment of the disclosure includes receiving a master information block (MIB) from a base station, receiving, based on the MIB, system information block (SIB) 1 from the base station, receiving, based on the SIB 1, at least one piece of system information including cell reselection-related information from the base station, and performing a cell reselection procedure, based on the cell reselection-related information. The cell reselection-related information includes cell reselection priority information for each frequency for a terminal having limited reception performance and cell reselection priority information for each frequency for a general terminal.

According to an embodiment of the disclosure, the cell reselection priority information for each frequency for the terminal having the limited reception performance includes a cell reselection priority value for a current frequency and at least one cell reselection priority value for each of at least one frequency different from the current frequency.

According to an embodiment of the disclosure, the cell reselection-related information further includes at least one threshold value used to determine whether the terminal having the limited reception performance is to perform the cell reselection procedure to a cell associated with a frequency having a higher priority than the current frequency.

According to an embodiment of the disclosure, the cell reselection priority information for each frequency for the terminal having the limited reception performance is cell reselection priority information for each frequency for a terminal having one reception antenna.

A method performed by a base station of a wireless communication system according to an embodiment of the disclosure includes transmitting a master information block (MIB), transmitting system information block (SIB) 1 according to the MIB, and transmitting at least one piece of system information including cell reselection-related information according to the SIB 1. The cell reselection-related information includes cell reselection priority information for each frequency for a terminal having limited reception performance and cell reselection priority information for each frequency for a general terminal.

According to an embodiment of the disclosure, the cell reselection priority information for each frequency for the terminal having the limited reception performance includes a cell reselection priority value for a current frequency and at least one cell reselection priority value for each of at least one frequency different from the current frequency.

According to an embodiment of the disclosure, the cell reselection-related information further includes at least one threshold value used to determine whether the terminal having the limited reception performance is to perform the cell reselection procedure to a cell associated with a frequency having a higher priority than the current frequency.

According to an embodiment of the disclosure, the cell reselection priority information for each frequency for the terminal having the limited reception performance is cell reselection priority information for each frequency for a terminal having one reception antenna.

A terminal of a wireless communication system according to an embodiment of the disclosure includes a transceiver and a controller. The controller is configured to control the transceiver to receive a master information block (MIB) from a base station, control the transceiver to receive, based on the MIB, system information block (SIB) 1 from the base station, control the transceiver to receive, based on the SIB 1, at least one piece of system information including cell reselection-related information from the base station, and perform a cell reselection procedure, based on the cell reselection-related information. The cell reselection-related information includes cell reselection priority information for each frequency for a terminal having limited reception performance and cell reselection priority information for each frequency for a general terminal.

According to an embodiment of the disclosure, the cell reselection priority information for each frequency for the terminal having the limited reception performance includes a cell reselection priority value for a current frequency and at least one cell reselection priority value for each of at least one frequency different from the current frequency.

According to an embodiment of the disclosure, the cell reselection-related information further includes at least one threshold value used to determine whether the terminal having the limited reception performance is to perform the cell reselection procedure to a cell associated with a frequency having a higher priority than the current frequency.

According to an embodiment of the disclosure, the cell reselection priority information for each frequency for the terminal having the limited reception performance is cell reselection priority information for each frequency for a terminal having one reception antenna.

A base station of a wireless communication system according to an embodiment of the disclosure includes a transceiver and a controller. The controller is configured to control the transceiver to transmit a master information block (MIB), control the transceiver to transmit system information block (SIB) 1 according to the MIB, and control the transceiver to transmit at least one piece of system information including cell reselection-related information according to the SIB 1. The cell reselection-related information includes cell reselection priority information for each frequency for a terminal having limited reception performance and cell reselection priority information for each frequency for a general terminal.

According to an embodiment of the disclosure, the cell reselection priority information for each frequency for the terminal having the limited reception performance includes a cell reselection priority value for a current frequency and at least one cell reselection priority value for each of at least one frequency different from the current frequency.

According to an embodiment of the disclosure, the cell reselection-related information further includes at least one threshold value used to determine whether the terminal having the limited reception performance is to perform the cell reselection procedure to a cell associated with a frequency having a higher priority than the current frequency.

According to an embodiment of the disclosure, the cell reselection priority information for each frequency for the terminal having the limited reception performance is cell reselection priority information for each frequency for a terminal having one reception antenna.

Advantageous Effects of Invention

According to an embodiment of the disclosure, a RedCap terminal having low reception performance can move to a base station supporting the RedCap terminal as quickly as possible, so that the RedCap terminal can quickly access a network and thus perform data communication.

In addition, according to an embodiment of the disclosure, a service provider can move a RedCap terminal having low reception performance to a frequency planned by the service provider within a short period of time, thereby guaranteeing the connection performance of the RedCap terminal.

MODE FOR THE INVENTION

Figure 1:
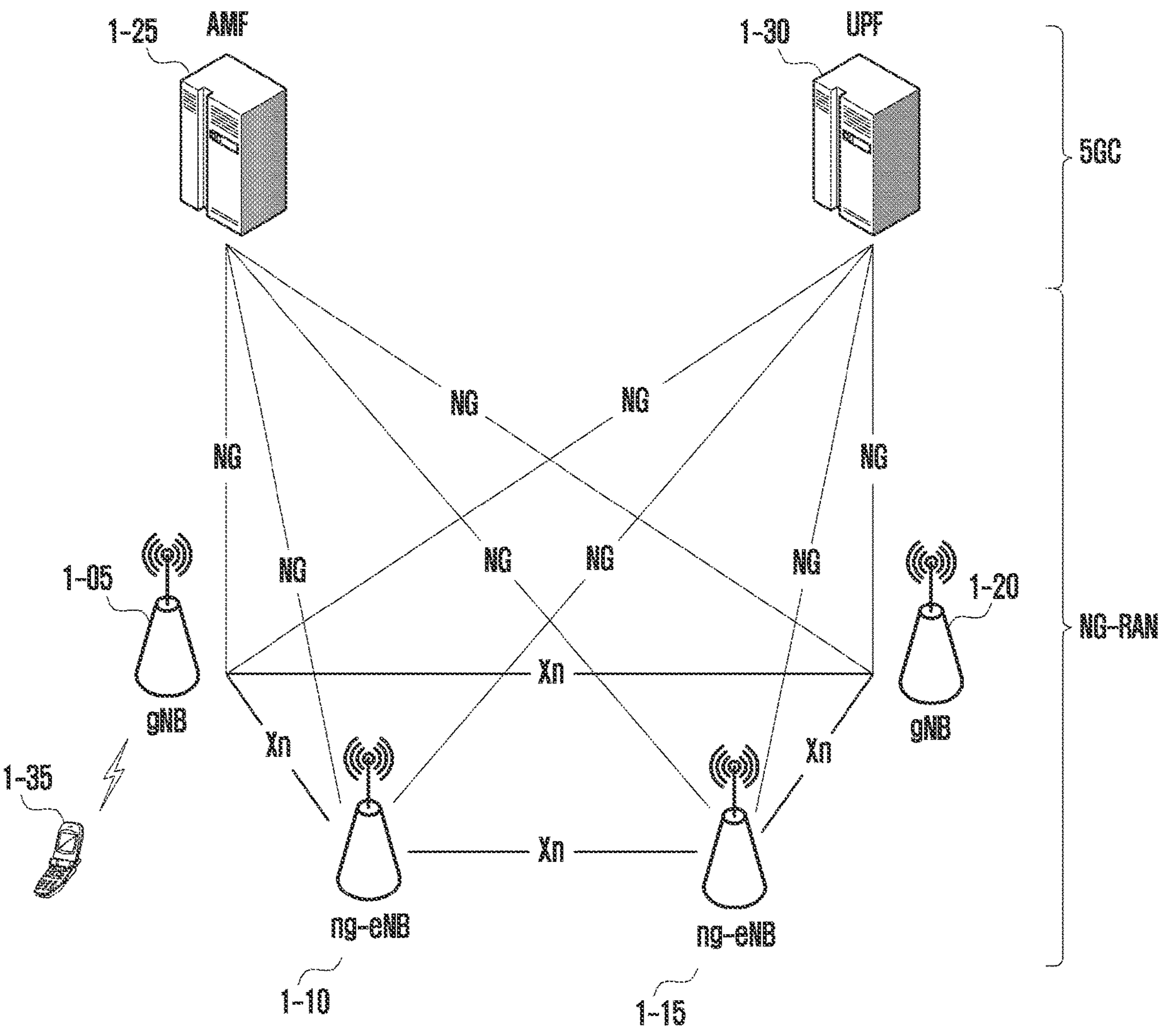
FIG. 1 illustrates a structure of an LTE system referred to for description of the disclosure.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the “unit” refers to a software element or a hardware element, such as a Field Programmable Gate Array (FPGA) or an Application Specific Integrated Circuit (ASIC), which performs a predetermined function. However, the “unit” does not always have a meaning limited to software or hardware. The “unit” may be constructed either to be stored in an addressable storage medium or to execute one or more processors. Therefore, the “unit” includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the “unit” may be either combined into a smaller number of elements, or a “unit”, or divided into a larger number of elements, or a “unit”. Moreover, the elements and “units” or may be implemented to reproduce one or more CPUs within a device or a security multimedia card.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description of the disclosure, terms and names defined in LTE and NR standards which are the latest standards specified by the 3rd generation partnership project (3GPP) group among existing communication standards will be used for the sake of descriptive convenience. However, the disclosure is not limited by these terms and names, and may be applied in the same way to systems that conform other standards.

FIG. 1 illustrates a structure of an NR system referred to for description of the disclosure.

Referring to FIG. 1, a wireless communication system may include multiple base stations 1-05, 1-10, 1-15, and 1-20, an access and mobility management function (AMR) 1-20, and a user plane function (UPF) 1-30. A user equipment (hereinafter, referred to as a UE or a terminal) 1-35 may access an external network through the base stations 1-05, 1-10, 1-15, and 1-20 and the UPF 1-30.

The base stations 1-05, 1-10, 1-15, and 1-20 are access nodes of a cellular network and may provide a wireless access to terminals which access the network. For example, the base stations 1-05, 1-10, 1-15, and 1-20 may collect status information such as a buffer status, an available transmission power status, and a channel status of the terminals to perform scheduling and support connection among the terminals and a core network (CN) (especially, a CN of an NR is called 5GC) in order to service traffic of users. In the communication, a user plane (UP) related to transmission of actual user data and a control plane (CP) such as connection management may be divided and configured, and in this figure, next generation node Bs (gNBs) 1-05 and 1-20 use UP and CP technologies defined in an NR technology, and eNBs (ng-eNBs) 1-10 and 1-15 which can interwork with a 5GC and gNB are connected to the 5GC, but use UP and CP technologies defined in an LTE technology.

An AMF/session management function (SMF) 1-25 is a device responsible for various control functions as well as a mobility management function for a terminal, and is connected to multiple base stations, and the UPF 1-30 is a kind of gateway device providing data transmission.

Figure 2:
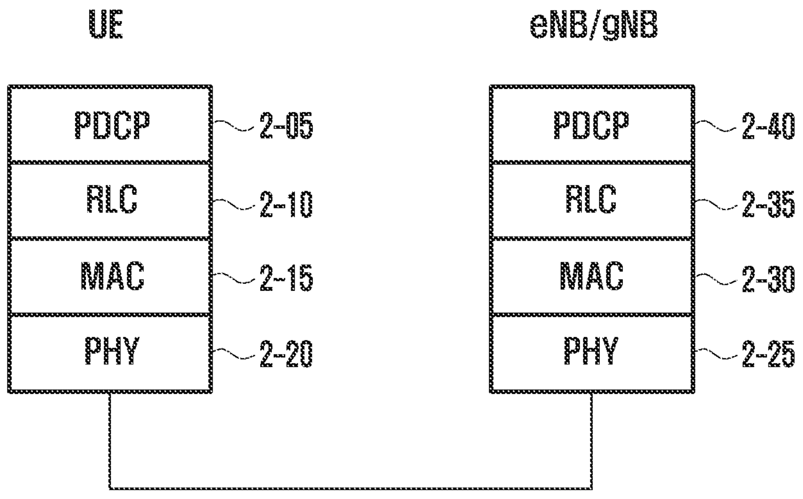
FIG. 2 illustrates a wireless protocol structure of an LTE system and an NR system referred to for description of the disclosure.

FIG. 2 illustrates a wireless protocol structure of an LTE system and an NR system referred to for description of the disclosure.

Referring to FIG. 2, in a wireless protocol of an LTE and an NR system, a terminal and an evolved node B (eNB) or a gNB include packet data convergence protocols (PDCPs) 2-05 and 2-40, radio link controls (RLCs) 2-10 and 2-35, and medium access controls (MACs) 2-15 and 2-30, respectively. The packet data convergence protocols (PDCPs) 2-05 and 2-40 are responsible for an operation such as IP header compression/decompression, and the radio link controls (hereinafter, referred to as RLCs) 2-10 and 2-35 may reconfigure a PDCP packet data unit (PDU) in an appropriate size. The MACs 2-15 and 2-30 are connected to several RLC layer devices configured in one terminal and may perform an operation of multiplexing RLC PDUs into a MAC PDU and demultiplexing the RLC PDUs from the MAC PDU. NR PHY layers 2-20 and 2-25 may perform an operation of channel-coding and modulating higher layer data into OFDM symbols to transmit the OFDM symbols via a wireless channel, or an operation of demodulating and channel-decoding OFDM symbols received via a wireless channel to deliver the demodulated and channel-decoded OFDM symbols to a higher layer. In addition, even the physical layers use a hybrid ARQ (HARQ) for additional error correction, and a receiving node may transmit whether to receive a packet transmitted by a transmitting node by 1 bit. This may be referred to as HARQ ACK/NACK information.

In the case of the LTE system, downlink HARQ ACK/NACK information for uplink data transmission may be transmitted via a physical channel such as a physical hybrid-ARQ indicator channel (PHICH), and in the case of the NR system, it may be determined whether retransmission is required or new transmission is required to be performed, via scheduling information of a corresponding terminal in a physical dedicated control channel (PDCCH) which is a channel via which downlink/uplink resource allocation is transmitted. This is because asynchronous HARQ is applied in the NR system. Uplink HARQ ACK/NACK information for downlink data transmission may be transmitted via a physical channel such as a physical uplink control channel (PUCCH) or a physical uplink shared channel (PUSCH). The PUCCH is generally transmitted in an uplink of a PCell to be described later. However, when a terminal is supportive, a base station may additionally transmit the PUCCH to the terminal in an SCell to be described, which is referred to as a PUCCH SCell.

Although not shown in the drawing, a radio resource control (RRC) layer exists above the PDCP layer of each of the terminal and the base station, and the RRC layer may transmit or receive access and measurement-related configuration control messages for radio resource control.

The PHY layer may include one or multiple frequencies/carriers, and a technology for simultaneously configuring and using multiple frequencies is called a carrier aggregation (hereinafter, referred to as CA) technology. In the CA technology, instead of using only one carrier, one or more secondary carriers in addition to a primary carrier are used for communication between a terminal (or a user equipment (UE)) and a base station (or an E-UTRAN NodeB (eNB)), to significantly increase the transmission amount as much as the number of secondary carriers. In the LTE system, a cell in a base station using a primary carrier is called a primary cell (PCell), and a cell in a base station using a subcarrier is referred to as a sub-cell or a secondary cell (SCell).

Figure 3:
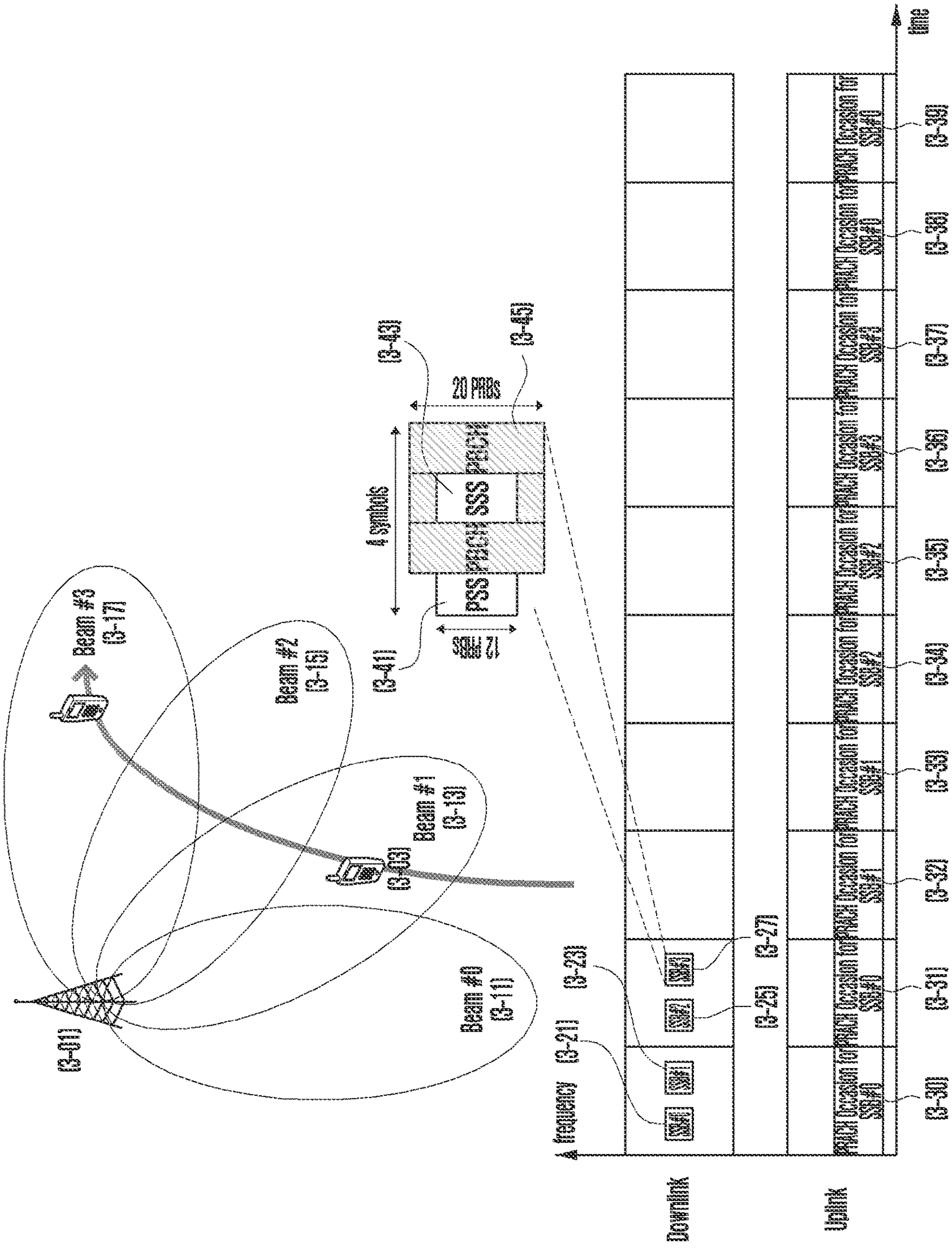
FIG. 3 illustrates an example of downlink and uplink channel frame structures when beam-based communication is performed in an NR system.

FIG. 3 illustrates an example of downlink and uplink channel frame structures when beam-based communication is performed in an NR system.

In FIG. 3, a base station 3-01 may transmit a signal in the form of a beam in order to increase coverage or to transmit a strong signal (3-11), (3-13), (3-15), and (3-17). Accordingly, a terminal 3-03 within a cell may transmit or receive data by using a specific beam (beam #1 3-13 in this illustrated drawing) transmitted by the base station.

Depending on whether the terminal is connected to the base station, the state of the terminal may be divided into an idle mode (RRC IDLE) state and a connected mode (RRC_CONNECTED) state. Accordingly, the base station may not be aware of the location of the terminal in the idle mode.

If the terminal in the idle mode is desired to transition to the connected mode state, the terminal may receive synchronization signal blocks (SSBs) 3-21, 3-23, 3-25, and 3-27 transmitted by the base station. The SSBs are SSB signals transmitted periodically according to a period configured by the base station, and each of the SSBs may be divided into a primary synchronization signal (PSS) 3-41, a secondary synchronization signal (SSS) 3-43, and a physical broadcast channel (PBCH).

In this illustrated drawing, a scenario in which an SSB is transmitted for each beam is assumed. For example, it is assumed that SSB #0 3-21 is transmitted using beam #0 3-11, SSB #1 3-23 is transmitted using beam #1 3-13, SSB #2 3-25 is transmitted using beam #2 3-15, and SSB #3 3-27 is transmitted using beam #3 3-17. In this illustrated drawing, it is assumed that the terminal in the idle mode is located in beam #1. However, even when the terminal in the connected mode performs random access, the terminal may select an SSB received at the time of performing random access.

Accordingly, in this drawing, the terminal receives SSB #1 transmitted via beam #1. If SSB #1 is received, the terminal acquires a physical cell identifier (PCI) of the base station via a PSS and an SSS, and receives a PBCH, so that the terminal may identify an identifier (that is, #1) of the currently received SSB, a location at which the SSB is currently received within a 10 ms frame, and a system frame number (SFN) having a period of 10.24 seconds in which the SSB is located. In addition, the PBCH may include a master information block (MIB), and the MIB may include information on where to receive system information block type 1 (SIB1) for broadcasting more detailed configuration information of the cell.

If the SIB1 is received, the terminal may be aware of the total number of SSBs transmitted by the base station, and may identify locations (assuming a scenario in which a PRACH occasion is allocated every 1 ms in this illustrated drawing: 3-30 to 3-39) of physical random access channel (PRACH) occasions in which the terminal may perform random access to transition to the connected mode state (more precisely, may transmit a preamble which is a physical signal specially designed for uplink synchronization). In addition, the terminal may identify which PRACH occasion among the PRACH occasions is mapped to which SSB index, based on the information. For example, in this illustrated drawing, a scenario in which a PRACH occasion is allocated every 1 ms and a scenario in which a half of an SSB is allocated per PRACH occasion (that is, two PRACH occasions per SSB) are assumed. Accordingly, a scenario in which two PRACH occasions are allocated for each SSB from the start of a PRACH occasion starting according to an SFN value is illustrated. For example, 3-30 and 3-31 are allocated for SSB #0, 3-32 and 3-33 are allocated for SSB #1, and so on. After PRACH occasions are configured for all SSBs, PRACH occasions 3-38 and 3-39 are allocated again for the first SSB.

Accordingly, the terminal may recognize locations of the PRACH occasions 3-32 and 3-33 for SSB #1 and thus may transmit a random access preamble at the currently earliest PRACH occasion between the PRACH occasions 3-32 and 3-33 corresponding to SSB #1 (for example, 3-32). Since the base station has received the preamble at the PRACH occasion 3-32, it can be known that the corresponding terminal has transmitted the preamble by selecting SSB #1. Accordingly, data may be transmitted or received through the corresponding beam when subsequent random access is performed.

When the terminal in the connected state moves from a current (source) base station to a target base station due to handover or the like, the terminal performs random access at the target base station, and perform an operation of selecting an SSB and transmitting random access as described above. In addition, during handover, a handover command is transmitted to the terminal to allow the terminal to move from the source base station to the target base station. In this case, the message may include a corresponding terminal dedicated random access preamble identifier allocated to each SSB of the target base station to enable use of the identifier when the terminal performs random access at the target base station. The base station may not allocate a dedicated random access preamble identifier for all beams (depending on the current location of the terminal, etc.), and some SSBs may not be allocated a dedicated random access preamble (for example, allocation of a dedicated random access preamble to Beam #2 and Beam #3 only). If a dedicated random access preamble is not allocated to an SSB selected by the terminal for preamble transmission, the terminal may randomly select a contention-based random access preamble to perform random access. For example, in this drawing, a scenario is possible in which after the terminal is located in Beam #1 and first performs random access but fails, the terminal is located in Beam #3 to transmit a dedicated preamble when transmitting a random access preamble again. Random access. For example, even in one random access procedure, when preamble retransmission is performed, a contention-based random access procedure and a contention-free random access procedure may be mixed depending on whether a dedicated random access preamble is allocated to a selected SSB for each preamble transmission.

Figure 4:
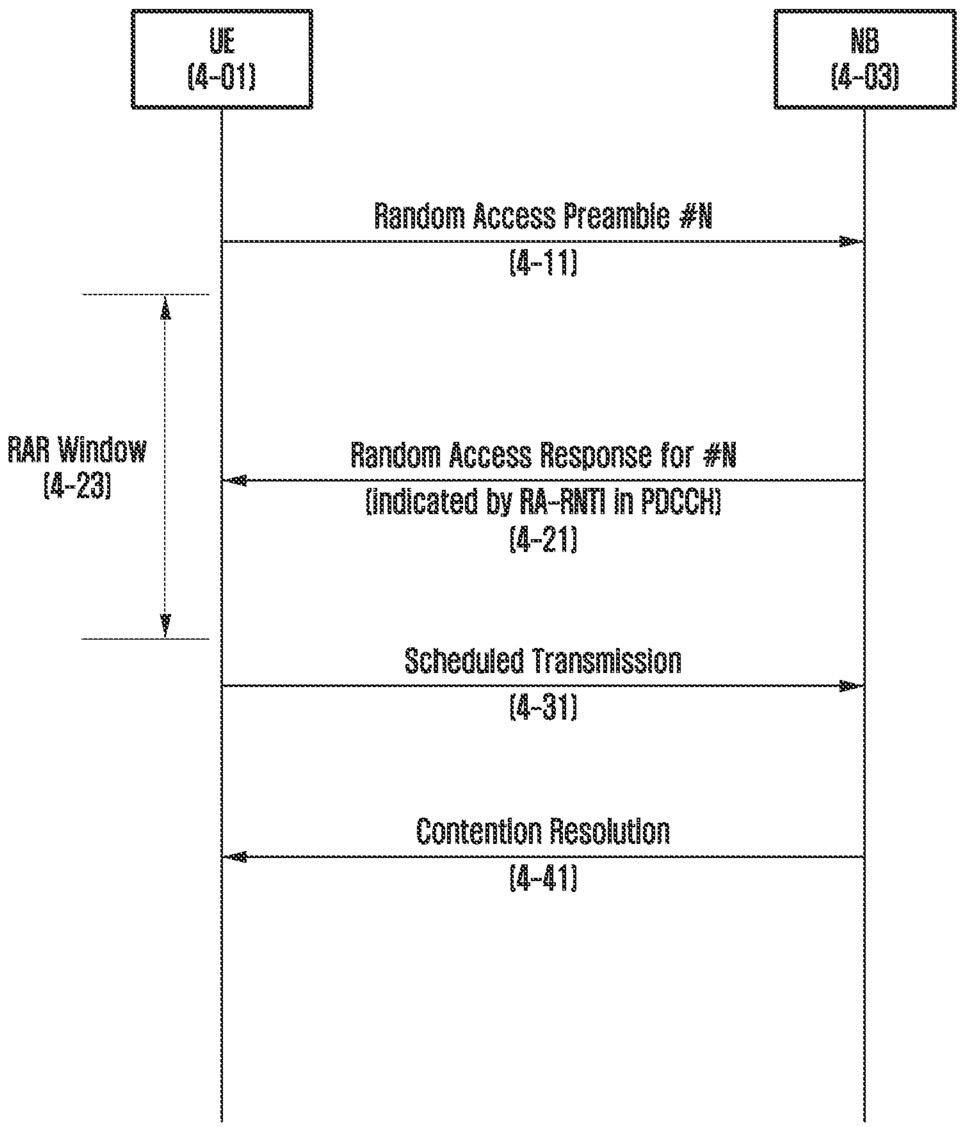
FIG. 4 illustrates a procedure for performing contention-based four-step random access by a terminal to a base station.

FIG. 4 illustrates a contention-based four-step random access procedure performed by a terminal in initial access to a base station, reconnection, handover, and other various cases in which random access is required.

For connection to a base station 4-03, a terminal 4-01 may select a PRACH according to the above-described FIG. 3 and transmit a random access preamble via a corresponding PRACH (4-11). A case in which one or more terminals simultaneously transmit a random access preamble via the PRACH resource may also occur. The PRACH resource may span one subframe or may occupy only some symbols within one subframe. Information on the PRACH resource may be included in system information broadcasted by the base station, and indicate a time-frequency resource to be used to transmit a preamble. In addition, the random access preamble is a specific sequence specially designed to be able to be received even though transmitted before synchronization with the base station is completely achieved, and may have a plurality of preamble identifiers (indexes) according to a standard. When there are a plurality of preamble indexes, the preamble transmitted by the terminal may be randomly selected by the terminal or may be a specific preamble designated by the base station.

Upon receiving the preamble, the base station may transmit a random access response (hereinafter, referred to as RAR) message (also referred to as Msg2) to the terminal (4-21). The RAR message may include identifier information of a preamble used in step 4-11, and may include uplink transmission timing correction information, uplink resource allocation information to be used in a subsequent step (step 4-31), temporary terminal identifier information, and the like. For example, when a plurality of terminals attempt random access by transmitting different preambles in step 4-11, the identifier information of the preamble may include responses to the respective preambles in the RAR message, and may be transmitted to indicate to which preamble the corresponding response message responds. The uplink resource allocation information included in each response to each preamble is detailed information of a resource to be used by the terminal in step 4-31, and may include a physical location and size of a resource, a modulation and coding scheme (MCS) used during transmission, and power adjustment information during transmission. When the terminal having transmitted the preamble performs initial access, since the terminal does not have an identifier assigned by the base station for communication with the base station, the temporary terminal identifier information may be a value transmitted for use therefore.

The RAR message may optionally include a backoff indicator (BI) in addition to response(s) to the respective preambles. The backoff indicator may be a value transmitted to delay transmission randomly according to a value thereof rather than immediately retransmitting the preamble when the random access preamble is required to be retransmitted due to unsuccessful random access. More specifically, when the terminal does not properly receive the RAR, or contention resolution, which will be described later, is not properly achieved, the random access preamble may be required to be retransmitted. In this case, the value indicated by the backoff indicator may indicate an index value in Table 1 below, and the terminal may randomly select a value from the range of 0 to the value indicated by the index, and retransmit the random access preamble after a time corresponding to the corresponding value. For example, when the base station indicates 5 (for example, 60 ms) as a BI value, when the terminal randomly selects a value of 23 ms from the range of 0 to 60 ms, the terminal may store the selected value in a variable called PREAMBLE BACKOFF and perform a procedure of retransmitting the preamble after 23 ms. If the backoff indicator is not transmitted, when the random access preamble is required to be retransmitted since random access is not successfully performed, the terminal may immediately transmit the random access preamble.

TABLE 1

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

The RAR message is required to be transmitted within a predetermined period starting from a predetermined time after the preamble is transmitted, and the period is referred to as a "RAR Window" 4-23. The RAR window may start from a time point when a predetermined time has elapsed from the transmission of the first preamble. The predetermined time may have a subframe unit (1 ms) or smaller value. In addition, the length of the RAR window may be a predetermined value configured by the base station for each PRACH resource or for each set of one or more PRACH resources in a system information message broadcasted by the base station.

When the RAR message is transmitted, the base station schedules the corresponding RAR message via a PDCCH, and corresponding scheduling information may be scrambled using a random access-radio network temporary identifier (RA-RNTI). The RA-RNTI is mapped to the PRACH resource used to transmit the message 4-11, the terminal having transmitted a preamble via a specific PRACH resource may determine whether there is a corresponding RAR message by attempting to receive the PDCCH, based on the corresponding RA-RNTI. For example, if the RAR message is a response to the preamble transmitted by the terminal in step 4-11 as shown in this illustrated drawing, the RA-RNTI used for this RAR message scheduling information may include information on the transmission 4-11. To this end, the RA-RNTI may be calculated by Equation 1 below.

$$RA\text{-RNTI}=1+s\_id+14\times t\_id+14\times 80\times f\_id+14\times 80\times 8\times ul\_carrier\_id \quad \text{Equation 1}$$

In this case, the s_id is an index corresponding to the first OFDM symbol at which the preamble transmission in step 4-11 is started, and may have a value of 0≤s_id<14 (that is, the maximum number of OFDM symbols in one slot). In addition, the t_id is an index corresponding to the first slot in which the preamble transmission in step 4-11 is started, and may have a value of 0≤t_id<80 (that is, the maximum number of slots in one system frame (10 ms)). In addition, the f_id indicates in which of PRACH resources on the frequency the preamble in step 4-11 has been transmitted, and may have a value of 0≤f_id<8 (that is, the maximum number of PRACHs on the frequency within the same time). In addition, the ul_carrier_id is a factor for, when two carriers are used in an uplink for one cell, discriminating whether the preamble is transmitted via a normal uplink (NUL) (0 in this case) or the preamble is transmitted via a supplementary uplink (SUL) (1 in this case).

The terminal having received the RAR message may transmit a different message over the resource allocated via the RAR message according to various purposes described above (4-31). The message is the third message transmitted in this illustrated drawing and is also called Msg3 (that is, the preamble in step 4-11 is called Msg1, and the RAR in step 4-21 is called Msg2). As an example of Msg3 transmitted by the terminal, an RRCSetupRequest message, which is an RRC layer message, may be transmitted for initial access, an RRCReestablishmentRequest message may be transmitted for reconnection, and an RRCReconfigurationComplete message may be transmitted for handover. Alternatively, a buffer status report (BSR) message may be transmitted for requesting a resource.

Thereafter, the terminal receives a contention resolution message from the base station (4-41) in case of initial transmission (for example, when Msg3 does not include base station identifier information previously assigned to the terminal, etc.), the contention resolution message includes the contents transmitted in Msg3 by the terminal as it is, so that even when there are a plurality of terminals having selected the same preamble in step 4-11, the contention resolution message may notify to which terminal the response responds.

Figure 5:
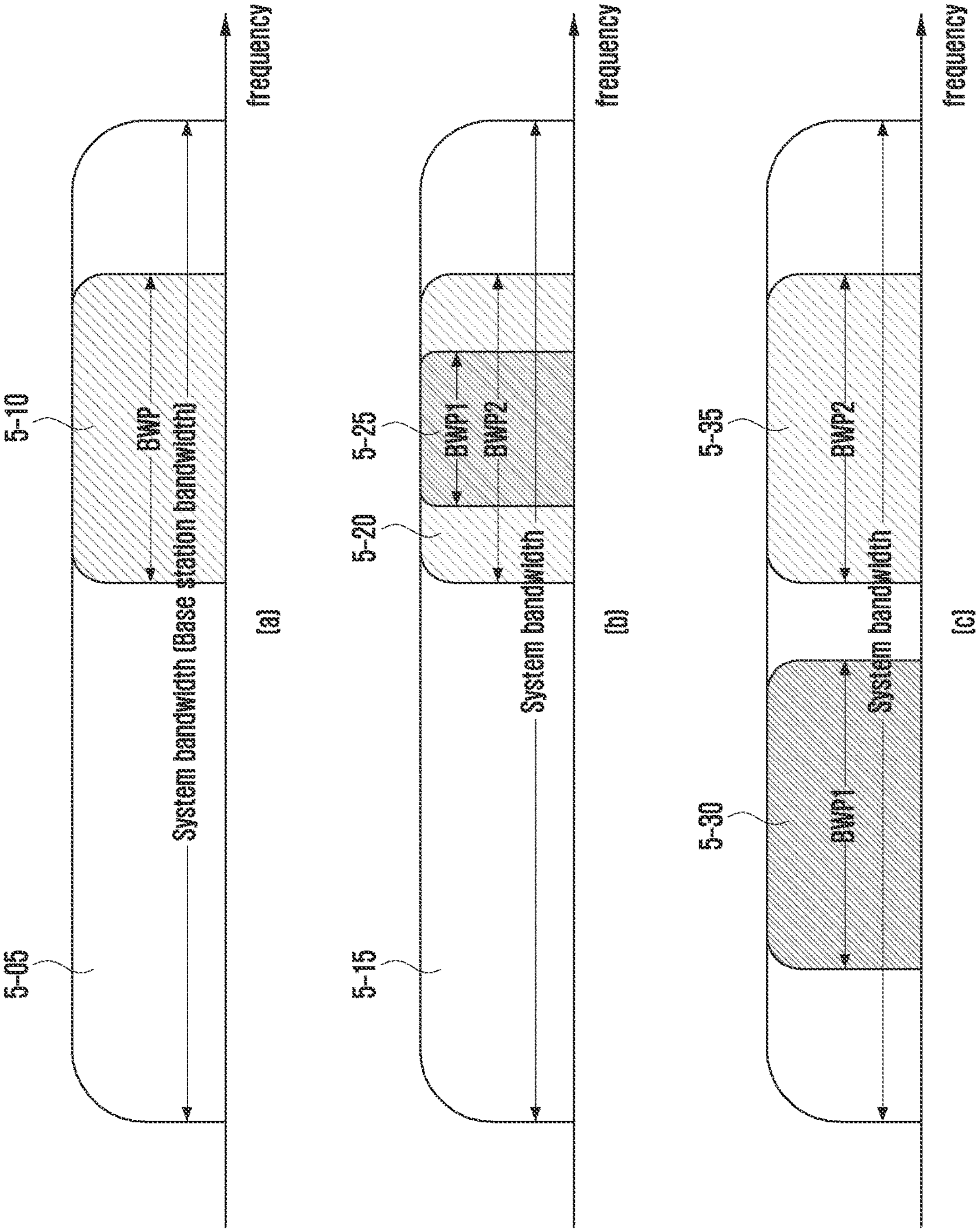
FIG. 5 illustrates a scenario in which a partial frequency band is applied in a next-generation mobile communication system.

FIG. 5 illustrates a scenario in which a partial frequency band is applied in a next-generation mobile communication system.

A partial frequency band (bandwidth part (BWP)) application technology means that one terminal performs communication by using only some of system frequency bandwidths (system bandwidths) used by one cell. The BWP may be used for the purpose of reducing manufacturing cost of a terminal or power saving of a terminal. The BWP may be configured by the base station only for a terminal which supports the same.

Referring to FIG. 5, there are three major BWP operation scenarios.

A first scenario is to apply a BWP for a terminal supporting only a frequency bandwidth 5-10 narrower than a system frequency bandwidth 5-05 used by one cell. In order to reduce manufacturing costs, a specific terminal may be developed to support a limited frequency bandwidth. The terminal is required to report to a base station that only the limited frequency bandwidth is supported, and the base station may configure a BWP less than or equal to the maximum bandwidth supported by the terminal.

A second scenario is to apply a BWP for power saving of a terminal. Although one terminal is performing communication by using an entire system frequency bandwidth 5-15 used by one cell or a frequency bandwidth 5-20 being a part thereof, but the communicating base station may configure a narrower frequency bandwidth 5-25 for the purpose of power saving.

A third scenario is to apply an individual BWP corresponding to a different numerology. The numerology refers to diversification of a physical layer configuration in order to implement optimal data transmission according to various service requirements. For example, in an OFDMA structure including a plurality of subcarriers, the distance between the subcarriers may be variably adjusted according to predetermined requirements. One terminal may perform communication by applying multiple numerologies at the same time. In this case, since physical layer configurations corresponding to the respective numerologies are different, it is desirable to apply the respective numerologies separately to individual BWPs 5-30 and 5-35.

A BWP, by which the terminal attempts to access when the terminal transitions from an RRC IDLE state or an inactive mode (RRC INACTIVE) state to an RRC_CONNECTED state, is called an initial BWP, and when the access to the base station is successful and the terminal enters the RRC_CONNECTED state, the terminal may receive a configuration of additional BWPs from the base station. In this case, one of the BWPs additionally configured by the base station may be configured as a default BWP to be described later, and if a default BWP is not separately configured, the initial BWP may become the default BWP.

In addition, in the above scenario, the terminal may receive a configuration of a plurality of BWPs, and then activate a specific BWP among the BWPs configured by the base station. For example, in the third scenario, the terminal may receive a configuration of BWP 1 (5-30) and BWP 2 (5-35) and the base station may activate one of the two BWPs. Accordingly, the terminal may transmit or receive data via the active BWP for each downlink and uplink in each of the above scenarios.

When the plurality of BWPs are configured as described above, the terminal may change the active BWP, which is referred to as BWP switching. The BWP switching may be performed by allocating a resource to a BWP to be switched on a PDCCH transmitted by the base station.

In an unlicensed band, a scenario using the same numerologies in the third scenario may also be applied. For example, in the unlicensed band, devices such as a wireless LAN operate with a bandwidth of 20 MHz, accordingly, as shown by 5-30 and 5-35 of the drawing, a plurality of BWPs each corresponding to 20 MHz may be configured to move terminals to the respective BWPs according to the degree of congestion of the unlicensed band.

Taking the second scenario as an example, when the terminal is in communication by using a wide bandwidth in an active PCell or SCell (5-15) and (5-20) and scheduling is not performed for a predetermined period of time (bwp-InactivityTimer) configured by the base station in a corresponding cell, the BWP of the terminal is changed/switched to the default BWP (for example, 5-25), and accordingly, the previously used BWP may be deactivated and the default BWP may be activated. Alternately, when the terminal is in communication by using a specific bandwidth (for example, 5-25) and the base station indicates scheduling of another BWP via the PDCCH, the terminal moves to the indicated BWP (for example, (5-20)), and in this case, the existing BWP may be deactivated, and the indicated BWP may be activated. In this case, the activated (currently used) BWP is referred to as an active BWP.

The NR is designed to support a wideband frequency bandwidth (for example, 100 MHz), but not all terminals need to support the wideband. For example, a wearable device such as a smart watch may require only a predetermined level of bandwidth capable of communication. Therefore, the need for a simple terminal with only essential functions has emerged from the requirements of the existing NR UEs, and such a terminal is referred to as a "RedCap" terminal. The RedCap terminal may have, for example, a bandwidth smaller than that of an existing NR terminal, such as 10 MHz or 20 MHz, and may support only default values including a subcarrier spacing (SCS) of 15 kHz. In addition, the maximum supported data rate may be limited to 20 Mbps or the like.

In addition, among RedCap terminals, there may be devices such as wearable devices that are difficult to include multiple antennas due to the small size thereof, and accordingly, a terminal having the smaller number of antennas than that of the existing terminal may also be considered. For example, there may be a RedCap terminal including only one reception antenna, which is referred to as a "RedCap terminal having 1RX (RedCap 1RX terminal)".

Figure 6:
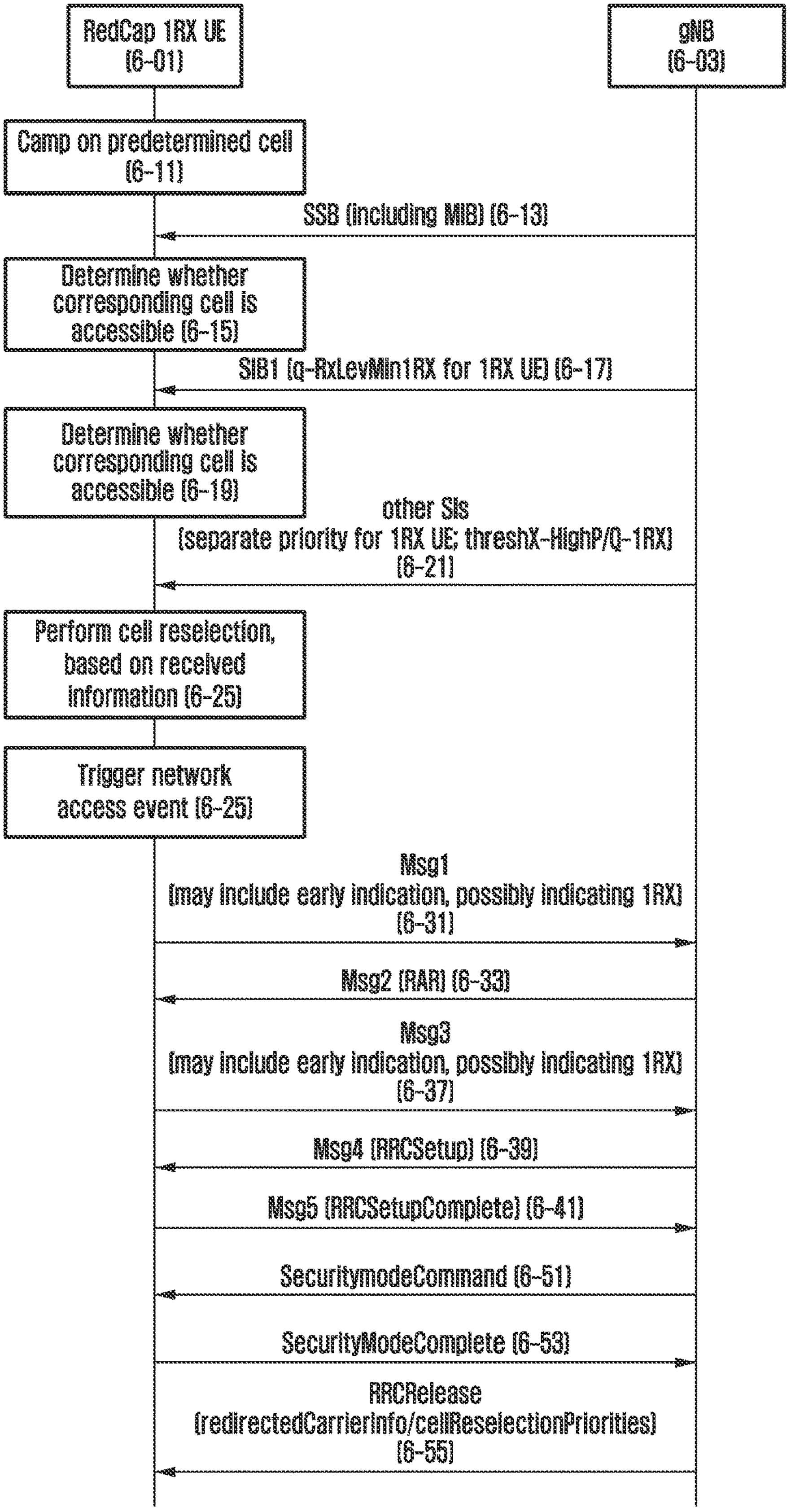
FIG. 6 is a sequence diagram illustrating an example of a message sequence flow between a base station and a RedCap 1RX terminal when the terminal performs a procedure to access the base station.

FIG. 6 is a sequence diagram illustrating an example of a message sequence flow between a base station and a RedCap 1RX terminal when the terminal performs a procedure to access the base station.

Hereinafter, among "reduced capability (RedCap)" terminals with reduced price and complexity in the disclosure, a terminal (or UE) having one reception antenna may be referred to as a RedCap 1RX terminal (or RedCap 1RX UE).

In this drawing, assuming that a terminal 6-01 is in an idle mode (RRC IDLE) without connection to a base station, the terminal may select and camp on a base station, from which a signal is detected in order to receive data transmitted from a network (6-11).

Thereafter, the terminal may receive an SSB transmitted from the base station 6-03 (6-13). The SSB includes an MIB, and a detailed structure of the MIB is shown in Table 2.

TABLE 2

| | |
|---|---|
| MIB ::= | SEQUENCE |
| systemFrameNumber | BIT STRING (SIZE (6)), |
| subCarrierSpacingCommon | ENUMERATED {scs15or60, |
| scs30or120}, | |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

In this case, the terminal may first determine whether the corresponding cell is a cell accessible by a RedCap terminal, by using information included in the MIB (6-15). The determination method is, for example, as follows. The terminal may first identify accessibility to the corresponding cell by using a cellBarred field and an intraFreqReselection field in the MIB. For example, values of the cellBarred field and the intraFreqReselection field may be configured as shown in Table 3 below.

TABLE 3

| cellBarred | intraFreqReselection |
|---|---|
| barred | allowed |
| barred | notAllowed |
| notBarred | Not used |

For example, when cellBarred is generally indicated as notBarred, an intraFreqReselection value may not be used (Not used). Accordingly, in the disclosure, when cellBarred is indicated as 'notBarred', the intraFreqReselection value may be configured to be 'allowed' to notify that the corresponding cell is a cell supporting a RedCap terminal (or a RedCap 1RX terminal, hereinafter used interchangeably). Conversely, cellBarred may be indicated as 'notBarred' and the intraFreqReselection value may be configured to be 'notAllowed' to notify that the corresponding cell is a cell which does not support the RedCap terminal (or RedCap 1RX terminal).

Alternatively, a method for notifying that the corresponding cell is a cell supporting a RedCap UE by using the remaining 1-bit spare field instead of the intraFreqReselection field may also be considered. Alternatively, a method for notifying that the corresponding cell is a cell supporting a RedCap 1RX UE by using the remaining 1-bit spare field instead of the intraFreqReselection field may also be considered.

If access barring or accessibility information for a RedCap 1RX UE is not indicated in the MIB, the terminal may additionally determine accessibility to the corresponding cell by using pdcch-ConfigSIB1 information. The pdcch-ConfigSIB1 may notify the location of a resource for monitoring a PDCCH via which SIB1 is scheduled. More specifically, a resource location in time and frequency domains is referred to as a control resource set (CORESET), and information indicating at what time and at what period the corresponding CORESET exists is referred to as a search space. Accordingly, the pdcch-ConfigSIB1 may include CORESET #0 and SEARCHSPACE #0 information, and provide resource information for monitoring a PDCCH which schedules SIB1. If a bandwidth of the CORESET is greater than a bandwidth supported by the RedCap terminal, since the terminal cannot monitor all of SIB1s, it is considered that the access to the corresponding cell is barred, and in the case of the RedCap terminal, even when the cellBarred is indicated as 'notBarred', whether to search for another cell within the same frequency by using the intraFreqReselection field may be determined.

When it is determined that the MIB is received via the above procedure and thus the cell is not barred, the terminal may receive SIB1 by using the above-described pdcch-ConfigSIB1 information (6-17). Since the bandwidth of an initial downlink (DL) BWP in the NR is the same as the bandwidth notified by the pdcch-ConfigSIB1 (the bandwidth of Coreset 0), a separate initial DL BWP for the RedCap terminal may not be required. However, a scenario where the base station only allows access from RedCap UEs with 2RX or more, among the RedCap UEs, and blocks access from 1RX UEs can still be considered. To this end, each barring information for the 1RX UE and the RedCap UE with 2RX or more may be transmitted via the SIB 1.

The base station may provide q-RxLevMin by the SIB1 to the terminal, and if a supplementary uplink (SUL) is used, the base station may provide a separate q-RxLevMinSUL for the SUL to adjust determination of whether the cell to which the terminal is currently connected has sufficient signal strength for communication. As such, the determination of whether the cell to which the terminal is currently connected has sufficient signal strength (Srxlev) and signal quality (Squal) for communication is called cell selection criterion S and may be expressed by Equation 2 below.

$$\text{Srxlev}>0 \text{ AND } \text{Squal}>0, \text{ where}$$

$$\text{Srxlev}=Q_{rxlevmeas}-(Q_{rxlevmin}+Q_{rxlevminoffset})P_{compensation}-\text{Qoffset}_{temp}$$

$$\text{Squal}=Q_{qualmeas}-(Q_{qualmin}+Q_{qualminoffset})-\text{Qoffset}_{temp} \quad \text{Equation 2}$$

In Equation 2, $Q_{rxlevmeas}$ may be a received signal strength value, and $Q_{qualmeas}$ may be a received signal quality value. The values may be corrected to be lower than the actually received signal strength or quality by subtracting, from the values, $Q_{qualmin}$ (q-QualMin) and (q-RxLevMin or q-RxLevMinSUL) transmitted by the SIB1, and whether the corresponding cell is suitable may be determined using the corrected values. In addition, $Q_{rxlevminoffset}$ or $Q_{qualminoffset}$ may be a value subtracted to access the network of an existing service provider when the terminal is roaming in another service provider's network. Further, $P_{compensation}$ may be a value adjusted according to power which can be transmitted via an uplink. Further, $Q_{offsettemp}$ may be a value applied to a base station which is actually unallowed to access since a downlink signal is abnormally transmitted (access is failed several times after attempting to access).

In Equation 2, in the case of a RedCap 1RX UE, a scenario in which a base station provides a separate value (for example, $Q_{rxlevmin,1RX}$ (q-RxLevMin1RX) or additionally provide $Q_{qualmin1RX}$ (q-QualMin1RX)) may be considered. Accordingly, if the base station transmits the corresponding information, the terminal may use the existing $Q_{rxlevmin}$ value as a separate value (q-RxLevMin1RX) signaled for the RedCap 1RX UE. In addition, the terminal may also use the existing $Q_{qualmin}$ value as a separate value (q-QualMin1RX) signaled for the RedCap 1RX UE. A value for a normal uplink (NUL) and a value for an SUL may be separately signaled as the separate value. Alternatively, a single value may be signaled as the separate value.

Alternatively, Equation 2 may be updated to Equation 3 below so that q-RxLevMin1RX or q-QualMin1RX is additionally subtracted.

$$\text{Srxlev}=Q_{rxlevmeas}-(Q_{rxlevmin}+Q_{rxlevmin,1RX}+Q_{rxlevminoffset})-P_{compensation}-\text{Qoffset}_{temp}$$

$$\text{Squal}=Q_{qualmeas}-(Q_{qualmin}+Q_{qualmin,1RX}+Q_{qualminoffset})\text{Qoffset}_{temp} \quad \text{Equation 3}$$

Even in this case, a value for an NUL and a value for an SUL may be separately signaled as the separate value. Alternatively, a single value may be signaled as the separate value.

According to the above methods, if there is a parameter additionally transmitted by the base station, the terminal replaces the existing parameter with the parameter or additionally reflects the parameter to calculate Srxlev and Squal values obtained by correcting the actually measured values.

If the access of the RedCap 1RX UE is barred via the MIB and SIB1, the terminal may search from a low frequency to determine whether the corresponding base station supports the RedCap 1RX UE. Alternately, even when the access is barred, additional other SIB information (for example, SIB2, SIB3, SIB4, etc.) is received from the corresponding cell, and information on a frequency and cell(s) which the RedCap 1RX UE is to preferentially access, to be described later, is obtained, and thus access to the corresponding frequency may be attempted.

By determining accessibility to the corresponding cell via the MIB and SIB1 (6-19), if it is determined that the cell is not barred, the terminal may receive other SIB information from the corresponding cell (6-21). The other SIB information may separately indicate by which cells on the same frequency (SIB2 or SIB3) and a different frequency (SIB4) the RedCap terminal is supported, and thus when the terminal reselects a cell due to a change in signal strength, etc., the other SIB information may be used to reselect a cell supporting the RedCap terminal. Alternatively, the information may indicate whether the corresponding frequency is a frequency supporting the RedCap terminal. In addition, the SIB2 (current frequency) and SIB4 (different frequency) may include a priority (cellReselectionPriority) for each frequency to indicate which frequency the RedCap terminal is required to select preferentially. In addition, the priority may be separately provided to a terminal having RedCap 2RX or more (a RedCap terminal having two or more reception antennas) and a RedCap 1RX terminal. Alternatively, the priority may be provided separately for each frequency only to the RedCap 1RX terminal. This is because, in the case of the terminal having RedCap 2RX or more, the terminal may operate with almost the same reception performance as the existing general terminal, and thus the terminal may operate in the same manner without separate processing.

Through the information, when there is a frequency having a higher priority than the current frequency, and/or when the terminal has passed, for example, more than 1 second in the current cell, the terminal may determine whether there is a cell which satisfies a predetermined condition among cells in the high-priority frequency frequently. For example, when the current cell broadcasts threshServingLowQ information, it may be determined whether Squal>$Thresh_{X,\ HighQ}$ is satisfied during $Treselection_{RAT}$ time, and otherwise, it may be determined whether Srxlev>$Thresh_{X,\ HighP}$ is satisfied during the $Treselection_{RAT}$ time. $Thresh_{X,\ HighP}$ or $Thresh_{X,\ HighQ}$ (threshX-HighP or threshX-HighQ) is a threshold for determining whether the terminal is suitable to move to signals of cells in a frequency having a high priority (that is, perform cell reselection to a corresponding cell), and the base station provides the threshold for each frequency by using the SIB4. In this case, since the RedCap 1RX terminal supports short coverage, even when a frequency has a higher priority, it may be desirable for the terminal to move on when the signal strength is sufficiently better. To this end, the base station may additionally transmit or configure a separate $Thresh_{X,\ HighP}$ or $Thresh_{X,\ HighQ}$ (threshX-HighP-1RX or threshX-HighQ-1RX) for the RedCap 1RX terminal. This may be expressed as, for example, $Thresh_{X,\ HighP}$, 1RX or $Thresh_{X,\ HighQ,\ 1RX}$. Therefore, in the case of the 1 RX UE, if the base station transmits the corresponding information separately to the 1 RX UE, in order to determine whether to move to a cell at the corresponding frequency, if the current cell broadcasts threshServingLowQ information, the terminal may determine whether Squal>$Thresh_{X,\ HighQ,\ 1RX}$ is satisfied during the $Treselection_{RAT}$ time, and otherwise, the terminal may determine whether Srxlev>$Thresh_{X,\ HighP,\ 1RX}$ is satisfied during the $Treselection_{RAT}$ time. If the corresponding information is not transmitted separately, the terminal may use Squal>$Thresh_{X,\ HighQ}$ and Srxlev>$Thresh_{X,\ HighP}$ to perform determination (6-25).

Thereafter, the terminal may perform triggering to establish an RRC connection according to a predetermined condition (6-27). As an example of the above, a case of receiving a paging message from a corresponding cell and identifying whether there is downlink data transmitted from the network, a case where there is data to be transmitted by the terminal via an uplink, or the like are possible. To this end, the terminal is required to transition to an RRC_CONNECTED mode for establishing a connection with the base station. To this end, the terminal may first perform random access to the current cell. For example, the terminal 6-01 may transmit a random access preamble (or a preamble or Msg 1, hereinafter used interchangeably) to the base station 6-03 (6-31). In FIG. 6, for convenience of understanding, although the base station operating the cell on which the terminal has camped and the base station operating the cell in which the terminal attempts random access after cell reselection are shown as the same, the base station operating the cell on which the terminal has camped may be different from the base station operating the cell in which the terminal attempts random access after cell reselection. The following are the same. The base station 6-03 having received the random access preamble may transmit a random access response (RAR) (or Msg2, hereinafter used interchangeably) to the terminal 6-01. After (6-33), the terminal 6-01 may transmit Msg3 to the base station 6-03 (6-37) and the base station 6-03 may transmit a contention resolution message (Msg 4) to the terminal 6-01 (6-41).

As described above, random access starts when the terminal transmits a preamble (6-31), and in this scenario, a scenario in which the base station allocates a dedicated PRACH occasion to which RedCap terminals can access may be considered. Alternatively, a scenario in which a PRACH occasion that can be used only by 1RX terminals among RedCap terminals is separately allocated may be considered. Accordingly, if the 1RX terminal determines that a corresponding dedicated PRACH occasion exists separately, the 1RX terminal may transmit a preamble through the corresponding PRACH occasion, and the base station may recognize that the terminal performing the corresponding random access is a RedCap 1RX terminal, and thus perform scheduling by using a more robust MCS from RAR transmission.

Alternatively, if the base station does not separately allocate a PRACH occasion that can be used only by 1RX terminals, the terminal may indicate that the corresponding terminal is a RedCap terminal or a RedCap 1RX terminal when transmitting Msg3 (message 3) during a random access procedure. As a method of indicating that the terminal is a RedCap terminal or a RedCap 1RX terminal, a separate logical channel identifier (LCID) indicating that the terminal is a RedCap 1RX terminal may be included in an MAC subheader and transmitted, or a method of using a spare bit of an RRC message (for example, an RRCSetupRequest message) included in Msg3 to explicitly indicate that the terminal is a RedCap terminal or a RedCap 1RX terminal, may also be considered, and a method of using a separate value for establishmentCause, resumeCause, or resumeCause, which is an access cause value included in an RRCSetupRequest, RRCResumeRequest, or RRCResumeRequest1 message, to explicitly indicate that the terminal is a RedCap terminal or a RedCap 1RX terminal, may also be considered.

Accordingly, the base station may determine whether the corresponding terminal is a RedCap terminal or a RedCap 1RX UE through information of the Msg1 or Msg3. The terminal may complete the connection procedure by transmitting an RRCSetupComplete (or Msg5) message (6-41). In addition, according to information of a message transmitted to a core network included in the Msg5, the base station may exchange messages to activate security between the base station and the terminal (access stratum (AS)) (6-51) and (6-53). After exchanging the messages, RRC layer control messages exchanged between the terminal and the base station may be encrypted and integrity protected. In addition, if the base station believes that the current 1RX terminal should immediately move to another base station/cell, the base station may immediately move the corresponding terminal to a specific frequency after the AS security is activated. To this end, the base station may transmit the corresponding command by using a redirectedCarrierInfo field in an RRCRelease message (6-55). In addition, a separate frequency-specific priority may be provided for a 1RX UE independently of the command, and the base station may transmit the corresponding command by using a cellReselectionPriorities field in the RRCRelease message.

Accordingly, the terminal may be moved to a frequency planned by a service provider within the shortest possible time, so that the connection performance of the terminal can be guaranteed.

Figure 7:
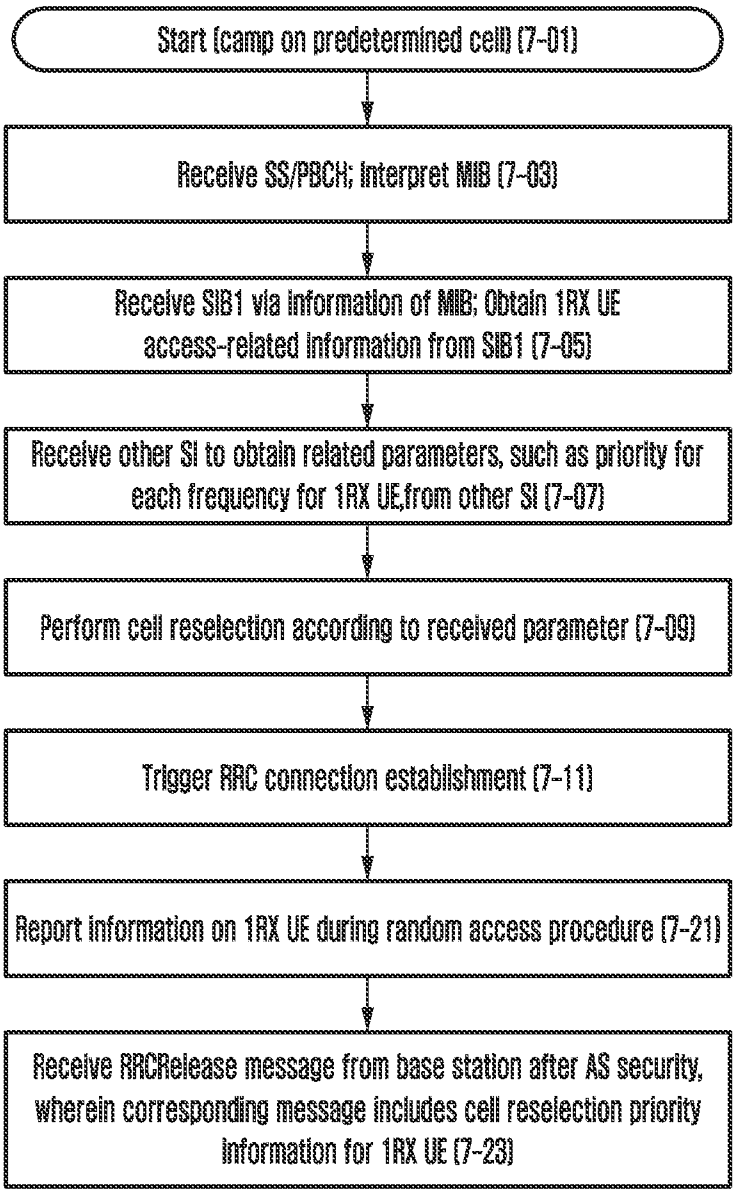
FIG. 7 is a flowchart illustrating an operation of a RedCap 1RX terminal when the terminal performs a procedure to access a base station.

FIG. 7 is a flowchart illustrating an operation of a RedCap 1RX terminal when the terminal performs a procedure to access a base station.

In this drawing, assuming that a terminal is in an idle mode (RRC IDLE) without connection to a base station, the terminal may select and camp on a base station, from which a signal is detected in order to receive data transmitted from a network (7-01).

Thereafter, the terminal may receive an SSB transmitted from a corresponding base station (7-03). The SSB includes an MIB, and a detailed structure of the MIB is shown in Table 4.

TABLE 4

```
MIB ::=                      SEQUENCE {
systemFrameNumber                BIT STRING (SIZE (6)),
subCarrierSpacingCommon            ENUMERATED {scs15or60, scs30or120},
ssb-SubcarrierOffset           INTEGER (0..15),
dmrs-TypeA-Position              ENUMERATED {pos2, pos3},
pdcch-ConfigSIB1               PDCCH-ConfigSIB1,
cellBarred                   ENUMERATED {barred, notBarred},
intraFreqReselection           ENUMERATED {allowed, notAllowed},
spare                        BIT STRING (SIZE (1))
}
```

In this case, the terminal may first determine whether the corresponding cell is a cell accessible by a RedCap terminal, by using information included in the MIB. The determination method is, for example, as follows.

The terminal may first identify accessibility to the corresponding cell by using a cellBarred field and an intraFreqReselection field in the MIB. For example, values of the cellBarred field and the intraFreqReselection field may be configured as shown in Table 5 below.

TABLE 5

| cellBarred | intraFreqReselection |
|---|---|
| barred | allowed |
| barred | notAllowed |
| notBarred | Not used |

For example, when cellBarred is generally indicated as notBarred, an intraFreqReselection value may not be used (Not used). Accordingly, in the disclosure, when cellBarred is indicated as notBarred, the intraFreqReselection value may be configured to be allowed to notify that the corresponding cell is a cell supporting a RedCap terminal (or a RedCap 1RX terminal, hereinafter used interchangeably). Conversely, cellBarred may be indicated as notBarred and the intraFreqReselection value may be configured to be notAllowed to notify that the corresponding cell is a cell which does not support the RedCap terminal (or RedCap 1RX terminal).

Alternatively, a method for notifying that the corresponding cell is a cell supporting a RedCap UE by using the remaining 1-bit spare field instead of the intraFreqReselection field may also be considered. Alternatively, a method for notifying that the corresponding cell is a cell supporting a RedCap 1RX UE by using the remaining 1-bit spare field instead of the intraFreqReselection field may also be considered.

If access barring or accessibility information for a RedCap 1RX UE is not indicated in the MIB, the terminal may additionally determine accessibility to the corresponding cell by using pdcch-ConfigSIB1 information. The pdcch-ConfigSIB1 may notify the location of a resource for monitoring a PDCCH via which SIB1 is scheduled. More specifically, a resource location in time and frequency domains is referred to as a control resource set (CORESET), and information indicating at what time and at what period the corresponding CORESET exists is referred to as a SEARCH SPACE. Accordingly, the pdcch-ConfigSIB1 may include CORESET #0 and SEARCHSPACE #0 information, and provide resource information for monitoring a PDCCH which schedules SIB1. If a bandwidth of the CORESET is greater than a bandwidth supported by the RedCap terminal, since the terminal cannot monitor all of SIB1s, it is considered that the access to the corresponding cell is barred, and in the case of the RedCap terminal, even when the cellBarred is indicated as notBarred, whether to search for another cell within the same frequency by using the intraFreqReselection field may be determined.

When it is determined that the MIB is received via the above procedure and thus the cell is not barred, the terminal may receive SIB1 by using the above-described pdcch-ConfigSIB1 information (7-05). Since the bandwidth of an initial downlink (DL) BWP in the NR is the same as the bandwidth notified by the pdcch-ConfigSIB1 (the bandwidth of Coreset 0), a separate initial DL BWP for the RedCap terminal may not be required. However, a scenario where the base station only allows access from RedCap UEs with 2RX or more, among the RedCap UEs, and blocks access from 1RX UEs can still be considered. To this end, each barring information for the 1RX UE and the RedCap UE with 2RX or more may be transmitted via the SIB 1.

The base station may provide q-RxLevMin by the SIB1 to the terminal, and if a supplementary uplink (SUL) is used, the base station may provide a separate q-RxLeyMinSUL for the SUL to adjust determination of whether the cell to which the terminal is currently connected has sufficient signal strength for communication. As such, the determination of whether the cell to which the terminal is currently connected has sufficient signal strength (Srxlev) and signal quality (Squal) for communication is called cell selection criterion S and may be expressed by Equation 4 below.

$$\text{Srxlev}>0 \text{ AND } \text{Squal}>0, \text{ where}$$

$$\text{Srxlev}=Q_{rxlevmeas}-(Q_{rxlevmin}+Q_{rxlevminoffset})-P_{compensation}-\text{Qoffset}_{temp}$$

$$\text{Squal}Q_{qualmeas}-(Q_{qualmin}+Q_{qualminoffset})-\text{Qoffset}_{temp} \quad \text{Equation 4}$$

In Equation 4, $Q_{rxlevmeas}$ may be a received signal strength value, and $Q_{qualmeas}$ may be a received signal quality value. The values may be corrected to be lower than the actually received signal strength or quality by subtracting, from the values, $Q_{qualmin}$ (q-QualMin) and $Q_{rxlevmin}$ (q-RxLevMin or q-RxLevMinSUL) transmitted by the SIB1, and whether the corresponding cell is suitable may be determined using the corrected values. In addition, $Q_{rxlevminoffset}$ or $Q_{qualminoffset}$ may be a value subtracted to access the network of an existing service provider when the terminal is roaming in another service provider's network. Further, $P_{compensation}$ may be a value adjusted according to power which can be transmitted via an uplink. Further, $\text{Qoffset}_{temp}$ may be a value applied to a base station which is actually unallowed to access since a downlink signal is abnormally transmitted (access is failed several times after attempting to access).

In Equation 4, in the case of a RedCap 1RX UE, a scenario in which a base station provides a separate value (for example, $Q_{rxlevmin,1RX}$ (q-RxLevMin1RX) or additionally provide $Q_{qualmin,1RX}$ (q-QualMin1RX)) may be considered. Accordingly, if the base station transmits the corresponding information, the terminal may use the existing $Q_{rxlevmin}$ value as a separate value (q-RxLevMin1RX) signaled for the RedCap 1RX UE. In addition, the terminal may also use the existing $Q_{qualmin}$ value as a separate value (q-QualMin1RX) signaled for the RedCap 1RX UE. A value for a normal uplink (NUL) and a value for an SUL may be separately signaled as the separate value. Alternatively, a single value may be signaled as the separate value.

Alternatively, Equation 2 may be updated to Equation 5 below so that q-RxLevMin1RX or q-QualMin1RX is additionally subtracted.

$$\text{Srxlev}=Q_{rxlevmeas}-(Q_{rxlevmin}+Q_{rxlevmim,1RX}+Q_{rxlevminoffset})-P_{compensation}-Q_{offSettemp}$$

$$\text{Squal}=Q_{qualmeas}-(Q_{qualmin}+Q_{qualmin,1RX}+Q_{qualminoffset})-\text{Qoffset}_{temp} \quad \text{Equation 5}$$

Even in this case, a value for an NUL and a value for an SUL may be separately signaled as the separate value. Alternatively, a single value may be signaled as the separate value.

According to the above methods, if there is a parameter additionally transmitted by the base station, the terminal replaces the existing parameter with the parameter or additionally reflects the parameter to calculate Srxlev and Squal values obtained by correcting the actually measured values.

If the access of the RedCap 1RX UE is barred via the MIB and SIB1, the terminal may search from a low frequency to determine whether the corresponding base station supports the RedCap 1RX UE. Alternately, even when the access is barred, additional other SIB information (for example, SIB2, SIB3, SIB4, etc.) is received from the corresponding cell, and information on a frequency and cell(s) which the RedCap 1RX UE is to preferentially access, to be described later, is obtained, and thus access to the corresponding frequency may be attempted.

By determining accessibility to the corresponding cell via the MIB and SIB1, if it is determined that the cell is not barred, the terminal may receive other SIB information from the corresponding cell (7-07). The other SIB information may separately indicate by which cells on the same frequency (SIB2 or SIB3) and a different frequency (SIB4) the RedCap terminal is supported, and thus when the terminal reselects a cell due to a change in signal strength, etc., the other SIB information may be used to reselect a cell supporting the RedCap terminal. Alternatively, the information may indicate whether the corresponding frequency is a frequency supporting the RedCap terminal. In addition, the SIB2 (current frequency) and SIB4 (different frequency) may include a priority (cellReselectionPriority) for each frequency to indicate which frequency the RedCap terminal is required to select preferentially. In addition, the priority may be separately provided to a terminal having RedCap 2RX or more (a RedCap terminal having two or more reception antennas) and a RedCap 1RX terminal. Alternatively, the priority may be provided separately for each frequency only to the RedCap 1RX terminal. This is because, in the case of the terminal having RedCap 2RX or more, the terminal may operate with almost the same reception performance as the existing general terminal, and thus the terminal may operate in the same manner without separate processing.

Through the information, when there is a frequency having a higher priority than the current frequency, and/or when the terminal has passed, for example, more than 1 second in the current cell, the terminal may determine whether there is a cell which satisfies a predetermined condition among cells in the high-priority frequency frequently. For example, when the current cell broadcasts threshServingLowQ information, it may be determined whether $\text{Squal}>\text{Thresh}_{X,\ HighQ}$ is satisfied during $\text{Treselection}_{RAT}$ time, and otherwise, it may be determined whether $\text{Srxlev}>\text{Thresh}_{X,\ HighP}$ is satisfied during the $\text{Treselection}_{RAT}$ time. $\text{Thresh}_{X,\ HighP}$ or $\text{Thresh}_{X,\ HighQ}$ (threshX-HighP or threshX-HighQ) is a threshold for determining whether the terminal is suitable to move to signals of cells in a frequency having a high priority (that is, perform cell reselection to a corresponding cell), and the base station provides the threshold for each frequency by using the SIB4. In this case, since the RedCap 1RX terminal supports short coverage, even when a frequency has a higher priority, it may be desirable for the terminal to move on when the signal strength is sufficiently better. To this end, the base station may additionally transmit or configure a separate $\text{Thresh}_{X,\ HighP}$ or $\text{Thresh}_{X,\ HighQ}$ (threshX-HighP-1RX or threshX-HighQ-1RX) for the RedCap 1RX terminal. This may be expressed as, for example, $\text{Thresh}_{X,\ HighP}$, 1RX or $\text{Thresh}_{X,\ HighQ,\ 1RX}$. Therefore, in the case of the 1 RX UE, if the base station transmits the corresponding information separately to the 1 RX UE, in order to determine whether to move to a cell at the corresponding frequency, if the current cell broadcasts threshServingLowQ information, the terminal may determine whether Squal>$Thresh_{X,\ HighQ,\ 1RX}$ is satisfied during the $Treselection_{RAT}$ time, and otherwise, the terminal may determine whether Srxlev>$Thresh_{X,\ HighP,\ 1RX}$ is satisfied during the $Treselection_{RAT}$ time. If the corresponding information is not transmitted separately, the terminal may use Squal>$Thresh_{X,\ HighQ}$ and Srxlev>$Thresh_{X,\ HighP}$ to perform determination (7-09).

Thereafter, the terminal may perform triggering to establish an RRC connection according to a predetermined condition (7-11). As an example of the above, a case of receiving a paging message from a corresponding cell and identifying whether there is downlink data transmitted from the network, a case where there is data to be transmitted by the terminal via an uplink, or the like are possible. To this end, the terminal is required to transition to an RRC_CONNECTED mode for establishing a connection with the base station. To this end, the terminal may first perform random access to the current cell. For example, the terminal may transmit a random access preamble (or a preamble or Msg1, hereinafter used interchangeably) to the base station. The terminal may receive a random access response (RAR) (or Msg2, hereinafter used interchangeably) from the base station having received the random access preamble. Thereafter, the terminal may transmit Msg3 to the base station and receive a contention resolution message (Msg 4) from the base station.

As described above, random access starts when the terminal transmits a preamble, and in this scenario, a scenario in which the base station allocates a dedicated PRACH occasion to which RedCap terminals can access may be considered. Alternatively, a scenario in which a PRACH occasion that can be used only by 1RX terminals among RedCap terminals is separately allocated may be considered. Accordingly, if the 1RX terminal determines that a corresponding dedicated PRACH occasion exists separately, the 1RX terminal may transmit a preamble through the corresponding PRACH occasion, and the base station may recognize that the terminal performing the corresponding random access is a RedCap 1RX terminal, and thus perform scheduling by using a more robust MCS from RAR transmission.

Alternatively, if the base station does not separately allocate a PRACH occasion that can be used only by 1RX terminals, the terminal may indicate that the corresponding terminal is a RedCap terminal or a RedCap 1RX terminal when transmitting Msg3 (message 3) during a random access procedure. As a method of indicating that the terminal is a RedCap terminal or a RedCap 1RX terminal, a separate logical channel identifier (LCID) indicating that the terminal is a RedCap 1RX terminal may be included in an MAC subheader and transmitted, or a method of using a spare bit of an RRC message (for example, an RRCSetupRequest message) included in Msg3 to explicitly indicate that the terminal is a RedCap terminal or a RedCap 1RX terminal, may also be considered, and a method of using a separate value for establishmentCause, resumeCause, or resumeCause, which is an access cause value included in an RRCSetupRequest, RRCResumeRequest, or RRCResumeRequest1 message, to explicitly indicate that the terminal is a RedCap terminal or a RedCap 1RX terminal, may also be considered.

Accordingly, the terminal may report the corresponding information or distinguish and use the resource so that the base station determines whether the corresponding terminal is a RedCap terminal or a RedCap 1RX UE through information of the Msg 1 or Msg3 (7-21).

The terminal may complete the connection procedure by transmitting an RRCSetupComplete (or Msg5) message. In addition, according to information of a message transmitted to a core network included in the Msg5, the base station may exchange messages to activate security between the base station and the terminal (access stratum (AS)). After exchanging the messages, RRC layer control messages exchanged between the terminal and the base station may be encrypted and integrity protected. In addition, if the base station believes that the current 1RX terminal should immediately move to another base station/cell, the base station may immediately move the corresponding terminal to a specific frequency after the AS security is activated. To this end, the base station may transmit the corresponding command by using a redirectedCarrierInfo field in an RRCRelease message. In addition, a separate frequency-specific priority may be provided for a 1RX UE independently of the command, and the base station may transmit the corresponding command by using a cellReselectionPriorities field in the RRCRelease message (7-23).

Accordingly, the terminal may be moved to a frequency planned by a service provider within the shortest possible time, so that the connection performance of the terminal can be guaranteed.

Figure 8:
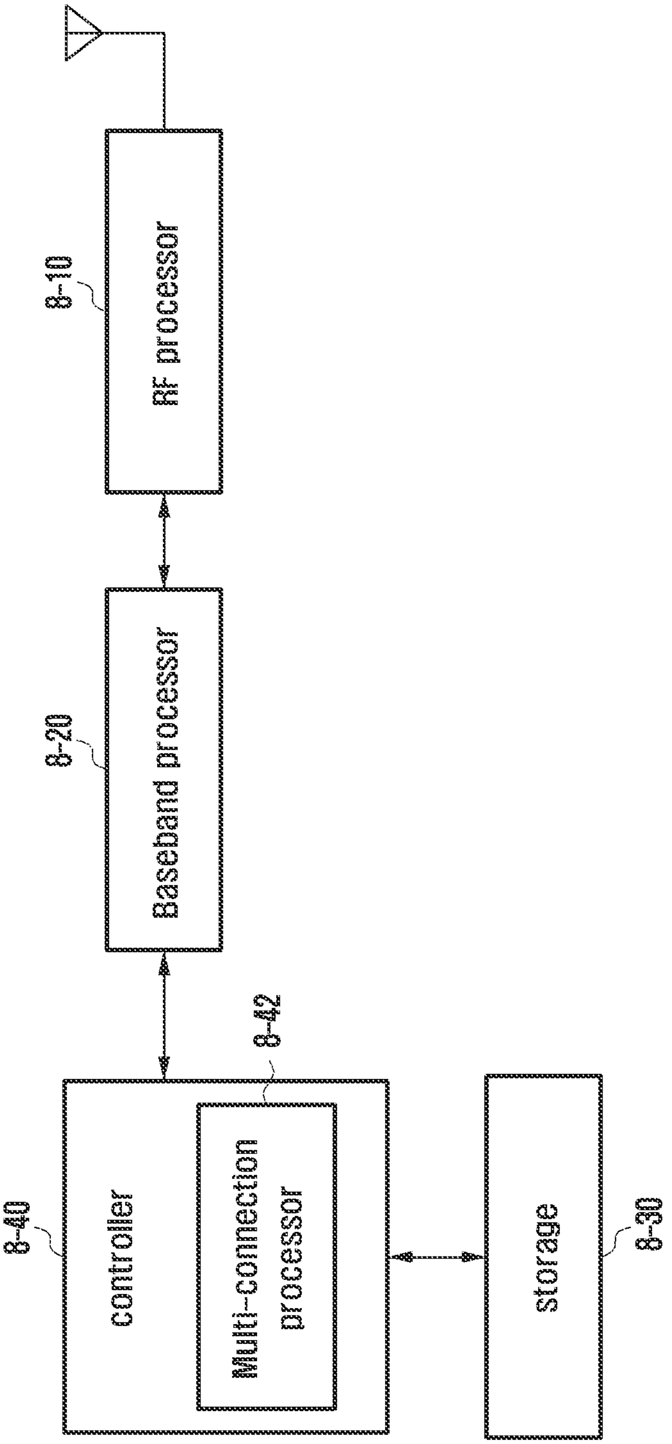
FIG. 8 illustrates a block structure of a terminal in a wireless communication system according to an embodiment of the disclosure.

FIG. 8 illustrates a block structure of a terminal in a wireless communication system according to an embodiment of the disclosure.

Referring to FIG. 8, a terminal may include a radio frequency (RF) processor 8-10, a baseband processor 8-20, a storage unit 8-30, and a controller 8-40.

The RF processor 8-10 performs functions of transmitting or receiving a signal via a wireless channel, such as band conversion and amplification of the signal. For example, the RF processor 8-10 up-converts a baseband signal provided from the baseband processor 8-20 into an RF band signal and then transmits the RF band signal via an antenna, and down-converts the RF band signal received via the antenna into the baseband signal. For example, the RF processor 8-10 may include a transmission filter, a reception filter, an amplifier, a mixer, an oscillator, a digital to analog convertor (DAC), an analog to digital convertor (ADC), and the like. In FIG. 8, only one antenna is shown, but the terminal may include a plurality of antennas. In addition, the RF processor 8-10 may include a plurality of RF chains. Furthermore, the RF processor 8-10 may perform beamforming. For the beamforming, the RF processor 8-10 may adjust a phase and a size of each of signals transmitted or received via the plurality of antennas or antenna elements.

The baseband processor 8-20 performs a conversion function between a baseband signal and a bit stream according to a physical layer standard of a system. For example, at the time of data transmission, the baseband processor 8-20 generates complex symbols by encoding and modulating transmission bit streams. In addition, at the time of data reception, the baseband processor 8-20 demodulates and decodes a baseband signal provided from the RF processor 8-10 to restore a reception bit stream. For example, according to an orthogonal frequency division multiplexing (OFDM) scheme, when data is transmitted, the baseband processor 8-20 generates complex symbols by encoding and modulating transmission bit streams and maps the complex symbols to sub-carriers, and then configures OFDM symbols via an inverse fast Fourier transform (IFFT) operation and a cyclic prefix (CP) insertion. In addition, at the time of data reception, the baseband processor 8-20 divides a baseband signal provided from the RF processor 8-10 into the units of OFDM symbols and restores the signals mapped to the sub-carriers via a fast Fourier transform (FFT) operation, and then restores a reception bit stream via demodulation and decoding.

The baseband processor 8-20 and the RF processor 8-10 transmit and receive a signal as described above. Accordingly, the baseband processor 8-20 and the RF processor 8-10 may be referred to as a transmitter, a receiver, a transceiver, or a communicator. Furthermore, at least one of the baseband processor 8-20 and the RF processor 8-10 may include a plurality of communication modules in order to support different radio access technologies. In addition, at least one of the baseband processor 8-20 and the RF processor 8-10 may include different communication modules in order to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.5 GHz and 5 GHz) band, and a millimeter wave (e.g., 60 GHz) band.

The storage unit 8-30 stores data such as a basic program, an application program, and configuration information for the operation of the terminal. In particular, the storage unit 8-30 may store information related to a wireless LAN node which performs wireless communication by using a wireless LAN access technology. In addition, the storage unit 8-30 provides stored data according to a request of the controller 8-40.

The controller 8-40 controls the overall operations of the terminal. For example, the controller 8-40 transmits or receives a signal through the baseband processor 8-20 and the RF processor 8-10. In addition, the controller 8-40 records and reads data on and from the storage unit 8-40. To this end, the controller 8-40 may include at least one processor. For example, the controller 8-40 may include a communication processor (CP) which performs a control for communication, and an application processor (AP) which controls a higher layer such as an application program. According to an embodiment of the disclosure, the controller 8-40 includes a multi-connection processor 8-42 which performs a process for operating in a multi-connection mode. For example, the controller 8-40 may control the terminal to perform the procedure shown in the operation of the terminal. Specifically, the controller 8-40 may control the transceivers 8-10 and 8-20 to receive system information according to an embodiment of the disclosure, and may also control the transceivers 8-10 and 8-20 to be able to transmit or receive a signal for performing a random access procedure with a base station.

The controller 8-40 according to an embodiment of the disclosure determines whether a corresponding cell is accessible, via values in a received MIB and SIB1, and if it is determined that the cell is accessible, additionally receives another SIB and selects a cell by using information provided for RedCap 1RX when selecting a neighboring cell.

Figure 9:
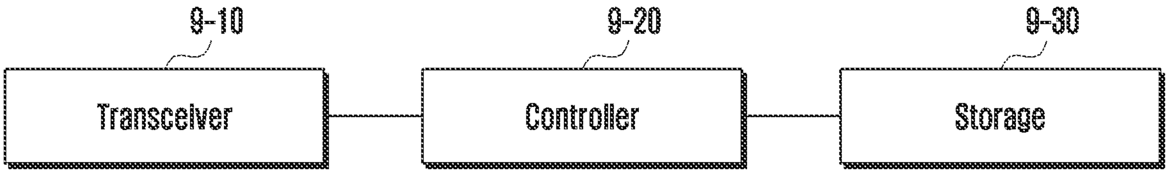
FIG. 9 illustrates a block structure of a base station in a wireless communication system according to an embodiment of the disclosure.

FIG. 9 illustrates a block structure of a base station in a wireless communication system according to an embodiment of the disclosure.

FIG. 9 illustrates a structure of a base station according to an embodiment of the disclosure.

Referring to FIG. 9, a base station may include a transceiver 9-10, a controller 9-20, and a storage unit 9-30. In the disclosure, the controller may be defined as a circuit, an application-specific integrated circuit, or at least one processor.

The transceiver 9-10 may transmit or receive a signal to or from other network entities. For example, the transceiver 9-10 may transmit system information to a terminal, and may transmit a synchronization signal or a reference signal.

The controller 9-20 may control the overall operation of the base station according to the embodiments proposed in the disclosure. For example, the controller 9-20 may control a signal flow between blocks so as to perform an operation according to the above-described flowchart. Specifically, the controller 9-20 may control the transceiver 9-20 to transmit system information according to an embodiment of the disclosure, and may also control the transceiver 9-10 to be able to transmit or receive a signal for performing a random access procedure with the terminal.

The storage unit 9-30 may store at least one of information transmitted or received via the transceiver 9-10 and information generated via the controller 9-20.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

The embodiments of the disclosure described and shown in the specification and the drawings are merely specific examples that have been presented to easily explain the technical contents of the disclosure and help understanding of the disclosure, and are not intended to limit the scope of the disclosure. It will be apparent to those skilled in the art that, in addition to the embodiments set forth herein, other variants based on the technical idea of the disclosure may be implemented.

The invention claimed is:

1. A method performed by a user equipment (UE) in a wireless communication system, the method comprising:

receiving, from a base station, a master information block (MIB);

receiving, from the base station, a system information block 1 (SIB1) based on the MIB;

receiving, from the base station, at least one piece of system information comprising cell reselection-related information based on the SIB1;

performing a cell reselection procedure, based on the cell reselection-related information and a number of reception antennas of the UE; and performing a random access procedure, wherein the UE is identified as a reduced capability (RedCap) UE during the random access procedure, based on a RedCap UE specific logical channel identifier (LCID) included in a medium access control (MAC) subheader of a message 3 (MSG3), wherein the cell reselection-related information includes first cell reselection priority information for RedCap UEs with one reception antenna and second cell reselection priority information for RedCap UEs with two or more reception antennas, the first cell reselection priority information being separate from the second cell reselection priority information.

2. The method of claim 1, wherein the cell reselection-related information comprises information on a frequency allowed for the RedCap UE to perform the cell reselection procedure.

3. The method of claim 1, wherein the UE is identified as the RedCap UE during the random access procedure, based on a RedCap UE specific physical random access channel (PRACH) occasion for a message 1 (MSG1).

4. The method of claim 1, wherein the SIB1 includes first information indicating whether a cell is barred for the RedCap UEs with one reception antenna and second information indicating whether the cell is barred for the RedCap UEs with two or more reception antennas.

5. A method performed by a base station in a wireless communication system, the method comprising:

transmitting a master information block (MIB);

transmitting a system information block 1 (SIB1);

transmitting at least one piece of system information comprising cell reselection-related information; and performing a random access procedure, wherein a UE performing the random access procedure with the base station is identified as a reduced capability (RedCap) UE during the random access procedure, based on a RedCap UE specific logical channel identifier (LCID) included in a medium access control (MAC) subheader of a message 3 (MSG3), wherein the cell reselection-related information includes first cell reselection priority information for RedCap UEs with one reception antenna and second cell reselection priority information for RedCap UEs with two or more reception antennas, the first cell reselection priority information being separate from the second cell reselection priority information.

6. The method of claim 5, wherein the cell reselection related information comprises information on a frequency allowed for the RedCap UE to perform a cell reselection procedure.

7. The method of claim 5, wherein the UE is identified as the RedCap UE during the random access procedure, based on a RedCap UE specific physical random access channel (PRACH) occasion for a message 1 (MSG1), and wherein the SIB1 includes first information indicating whether a cell is barred for the RedCap UEs with one reception antenna and second information indicating whether the cell is barred for the RedCap UEs with two or more reception antennas.

8. A user equipment (UE) in a wireless communication system, the UE comprising:

a transceiver; and a controller configured to:

receive, from a base station via the transceiver, a master information block (MIB), receive, from the base station via the transceiver, system information block 1 (SIB1) based on the MIB, receive, from the base station via the transceiver, at least one piece of system information comprising cell reselection-related information based on the SIB1, perform a cell reselection procedure, based on the cell reselection-related information and a number of reception antennas of the UE, and perform a random access procedure, wherein the UE is identified as a reduced capability (RedCap) UE during the random access procedure, based on a RedCap UE specific logical channel identifier (LCID) included in a medium access control (MAC) subheader of a message 3 (MSG3), wherein the cell reselection-related information includes first cell reselection priority information for RedCap UEs with one reception antenna and second cell reselection priority information for RedCap UEs with two or more reception antennas, the first cell reselection priority information being separate from the second cell reselection priority information.

9. The UE of claim 8, wherein the cell reselection related information comprises information on a frequency allowed for the RedCap UE to perform the cell reselection procedure.

10. The UE of claim 8, wherein the UE is identified as the RedCap UE during the random access procedure, based on a RedCap UE specific physical random access channel (PRACH) occasion for a message 1 (MSG1).

11. The UE of claim 8, wherein the SIB1 includes first information indicating whether a cell is barred for the RedCap UEs with one reception antenna and second information indicating whether the cell is barred for the RedCap UEs with two or more reception antennas.

12. A base station in a wireless communication system, the base station comprising:

a transceiver; and a controller configured to:

transmit, via the transceiver, a master information block (MIB), transmit, via the transceiver, system information block 1 (SIB1), transmit, via the transceiver, at least one piece of system information comprising cell reselection-related information, and perform a random access procedure, wherein a UE performing the random access procedure with the base station is identified as a reduced capability (RedCap) UE during the random access procedure, based on a RedCap UE specific logical channel identifier (LCID) included in a medium access control (MAC) subheader of a message 3 (MSG3), wherein the cell reselection-related information includes first cell reselection priority information for RedCap UEs with one reception antenna and second cell reselection priority information for RedCap UEs with two or more reception antennas, the first cell reselection priority information being separate from the second cell reselection priority information.

13. The base station of claim 12, wherein the cell reselection related information comprises information on a frequency allowed for the RedCap UE to perform a cell reselection procedure.

14. The base station of claim 12, wherein the UE is identified as the RedCap UE during the random access procedure, based on a RedCap UE specific physical random access channel (PRACH) occasion for a message 1 (MSG1).

15. The base station of claim 12, wherein the SIB1 includes first information indicating whether a cell is barred for the RedCap UEs with one reception antenna and second information indicating whether the cell is barred for the RedCap UEs with two or more reception antennas.

* * * * *